(12) United States Patent
Takayanagi (10) Patent No.: US 11,258,130 B2
(45) Date of Patent: Feb. 22, 2022

(54) BATTERY SPACER (71) Applicant: FDK CORPORATION, Tokyo (JP)

(72) Inventor: Mika Takayanagi, Tokyo (JP)

(73) Assignee: FDK CORPORATION, Tokyo (JP)

( * ) Notice: Subject to any disclaimer, the term of this patent is extended or adjusted under 35 U.S.C. 154(b) by 87 days.

(21) Appl. No.: 16/327,601

(22) PCT Filed: Jun. 18, 2017

(86) PCT No.: PCT/JP2017/025949
§ 371 (c)(1),
(2) Date: Feb. 22, 2019

(87) PCT Pub. No.: WO2018/037772
PCT Pub. Date: Mar. 1, 2018

(65) Prior Publication Data
US 2019/0214614 A1 Jul. 11, 2019

(30) Foreign Application Priority Data

Aug. 25, 2016 (JP) .............................. JP2016-164494

(51) Int. Cl.
*H01M 2/10* (2006.01)
*H01M 50/213* (2021.01)
(Continued)

(52) U.S. Cl.
CPC ....... *H01M 50/213* (2021.01); *H01M 50/107* (2021.01); *H01M 50/20* (2021.01)

(58) Field of Classification Search
CPC ...... H01M 2/02; H01M 2/0202; H01M 2/022; H01M 2/0222; H01M 2/0225;
(Continued)

(56) References Cited

U.S. PATENT DOCUMENTS 3,684,583 A * 8/1972 Lehnen et al. ...... H01M 50/213
429/54
3,969,148 A * 7/1976 Trattner .............. H01M 50/213
429/100
(Continued)

FOREIGN PATENT DOCUMENTS

JP    S63132366 A    6/1988
JP    0254163 U     4/1990
(Continued)

OTHER PUBLICATIONS

English translation of International Search Report dated Aug. 29, 2017, for corresponding PCT Application No. PCT/JP2017/025949.
(Continued)

*Primary Examiner* — Edward J. Schmiedel
(74) *Attorney, Agent, or Firm* — Kinney & Lange, P.A.

(57) ABSTRACT

A battery spacer comprises: a cylindrical case body into which a battery is inserted; a bottom wall portion with which an anode-side end of the battery is to come into contact, the bottom wall portion having an anode exposure hole from which a negative terminal of the battery is partially exposed; an annular top wall member that is located opposite to the bottom wall portion 8 and has a central opening into which the battery is inserted; a plurality of anode-side catching pieces that have anode-side engagement hooks extending from the circumference of the anode exposure hole toward the interior of the case body and engaging with an anode-side outer peripheral surface of the battery, and hold the anode side of the battery; and a plurality of cathode-side catching pieces that have cathode-side engagement hooks extending from the circumference of a central opening toward the interior of the case body and engaging with a cathode-side outer peripheral surface of the battery, and hold the cathode side of the battery.

6 Claims, 9 Drawing Sheets

(51) Int. Cl.
*H01M 50/20* (2021.01)
*H01M 50/107* (2021.01)

(58) Field of Classification Search
CPC .. H01M 2/0227; H01M 2/023; H01M 2/0232; H01M 2/0235; H01M 2/10; H01M 2/105
USPC ............................. 429/96, 97, 98, 99, 100
See application file for complete search history.

(56) References Cited

U.S. PATENT DOCUMENTS

| | | | | |
|---|---|---|---|---|
| 3,998,516 A | * | 12/1976 | Mabuchi | H01M 50/213 439/500 |
| 4,020,245 A | * | 4/1977 | Mabuchi | H01M 50/213 429/100 |
| 4,397,920 A | * | 8/1983 | Trattner | H01M 2/105 429/100 |
| 2007/0148536 A1 | | 6/2007 | Kang et al. | |
| 2012/0295146 A1 | | 11/2012 | Song | |

FOREIGN PATENT DOCUMENTS

| | | |
|---|---|---|
| JP | 04-351845 | 12/1992 |
| JP | 2013131433 A | 7/2013 |

OTHER PUBLICATIONS

Extended European Search Report dated Mar. 25, 2020, received for corresponding European Application No. 17843259.7, 7 pages.

\* cited by examiner

BATTERY SPACER

CROSS-REFERENCE TO RELATED APPLICATION(S)

This application is the national phase of PCT Application No. PCT/JP2017/025949 filed on Jul. 18, 2017, which in turn claims priority to Japanese Application No. 2016-164494 filed on Aug. 25, 2016, the disclosures of which are incorporated by reference herein in their entireties.

TECHNICAL FIELD

The present disclosure relates to a battery spacer, particularly to a battery spacer with which the size of a cylindrical battery can be changed.

BACKGROUND

A cylindrical battery is used as a power source for various electric devices. The size of this cylindrical battery is determined by international standards or Japanese Industrial Standards. In general, an electric device has a battery compartment to be installed with a battery. The internal shape of this battery compartment is adapted to a cylindrical battery based on specific standards used for the electrical device. For this reason, for an electric device having a battery compartment adapted to tan-2 batteries (which is a name uniquely used in Japan), for example, batteries of other sizes, such as tan-3 batteries (which is a name uniquely used in Japan), cannot be used. It should be noted that a tan-2 battery corresponds to an R14 or C battery, and a tan-3 battery corresponds to an R6 or AA battery.

By the way, when the need arises for replacing a battery of an electric device, inconvenient situations such as not having an appropriate sized battery on hand may often occur. In order to avoid such inconvenient situations, various devices (battery spacers) for changing the battery size have been proposed (see, for example, Japanese Patent No. 5605352).

A conventional battery spacer typified by that disclosed in Japanese Patent No. 5605352 has, for example, the same outer shape as a tan-2 battery as a whole, and has a case body including a container that can contain a tan-3 battery. The case body has a retainer for retaining the cathode portion of the battery so that the positive terminal of the contained battery protrudes from one end face thereof, and an opening for exposing the negative terminal of the contained battery on the other end face thereof.

The above-described retainer includes a plurality of battery retaining ribs to come into contact with the outer peripheral surface of the battery, and a plurality of latches to engage with the periphery of the positive terminal on one end face of the battery, that is, a so-called shoulder portion of the battery. These battery retaining ribs and latches are alternately arranged.

To be specific, such a battery spacer is used in the following manner.

A tan-3 battery is inserted from the positive terminal side into the opening on the other end face side of the case body. Regarding the inserted battery, the shoulder portion bumps against the latches of the case body, only the positive terminal protrudes on one end face of the case body, and the peripheral surface adjacent to the cathode is retained so that it is engaged with a plurality of battery retaining ribs on one end face of the case body. At this time, a negative terminal portion of the battery is exposed from the opening in the other end face of the case body.

A battery spacer containing a tan-3 battery in the above-described manner is installed in a tan-2 battery compartment of an electric device, and is used as a tan-2 battery. In other words, when an electric device only compatible with tan-2 batteries needs battery replacement, even if there is only a tan-3 battery on hand, the electric device can be driven with the tan-3 battery the size of which has been changed to tan-2 with the battery spacer.

By the way, conventional battery spacers do not always have adequate ability to retain batteries: if the user shakes the battery spacer with the battery contained inside, the battery may accidentally pop out from the opening provided in the other end face of the case body.

Batteries are sized according to standards. However, there is an allowable range of the dimensions determined by these standards, and even for the same type of battery, there are slight differences in size of each part of the battery depending on the manufacturer or battery type. For example, even for the same tan-3 battery, the height of the positive terminal from the shoulder portion of the battery and the outside diameter of the battery may be different.

Regarding the conventional battery spacer described above, if the latches are relatively thick in a battery in which the positive terminal has a relatively low height, the positive terminal does not protrude from one end face of the case body in some cases. In such a case, the positive terminal of the battery may fail to come into contact with the cathode-side contact of the battery compartment.

In general, battery spacers are often manufactured by battery manufacturers. In this case, a battery spacer is manufactured with a size of each part determined according to the outside diameter of the battery produced by the company. In other words, the size of each part of the battery spacer is determined by each manufacturer, and the outside diameter of a battery that can be contained in the battery spacer is limited. For this reason, batteries produced by different manufacturers or of different types cannot properly fit in the same battery spacer in some cases. In other words, a battery having an outside diameter larger than a preset outside diameter cannot be inserted into the battery spacer, and a battery having an outside diameter smaller than the preset outside diameter may accidentally easily get out of the case body.

An object of the present disclosure, which has been made based on the above circumstances, is to provide a battery spacer that has higher ability to retain a battery contained therein and has excellent general versatility so that it is applicable to batteries from different manufacturers or of different types.

SUMMARY

The present disclosure provides a battery spacer comprising: a cylindrical body into which a cylindrical battery is inserted; a bottom wall portion with which an anode-side end of the cylindrical battery is to come into contact, the bottom wall portion having an anode exposure hole from which a negative terminal of the cylindrical battery is partially exposed; a first holder that holds an outer peripheral surface of the cylindrical battery; and a second holder that holds the outer peripheral surface of the cylindrical battery in a position separated from the first holder along the direction of the axis of the cylindrical battery.

The present disclosure can provide a battery spacer that has higher ability to retain a battery contained therein and has excellent general versatility so that it is applicable to batteries from different manufacturers or of different types.

DETAILED DESCRIPTION

A battery spacer 2 according to the present disclosure will now be described with reference to the accompanying drawings.

Figure 1:
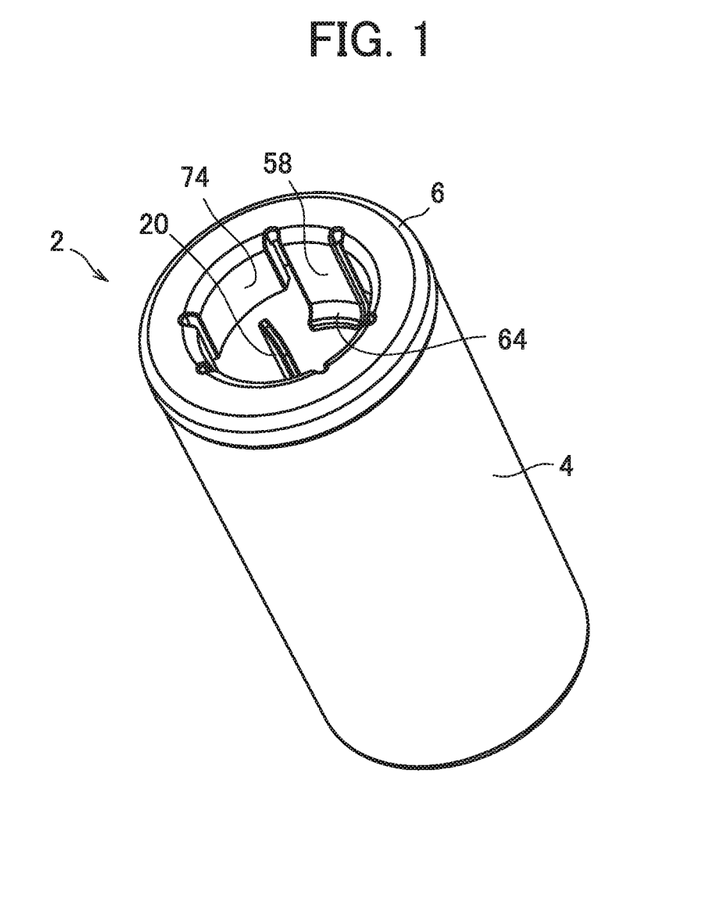
FIG. 1 is a perspective view of a battery spacer according to one embodiment of the present disclosure.

The battery spacer 2 is composed of an insulating resin and has a generally cylindrical shape as shown in FIG. 1. The outer shape of the battery spacer 2 is substantially the same as that of a tan-2 battery. To be specific, the length of the battery spacer 2 along the direction of its central axis is equal to the height of the tan-2 battery from the bottom wall portion to the shoulder portion, and the outside diameter of the battery spacer 2 is equal to that of the tan-2 battery.

The battery spacer 2 includes a case body 4 serving as a main body and a top wall member 6 integrally provided at one end of the case body 4 and serving as a top wall.

Figure 2:
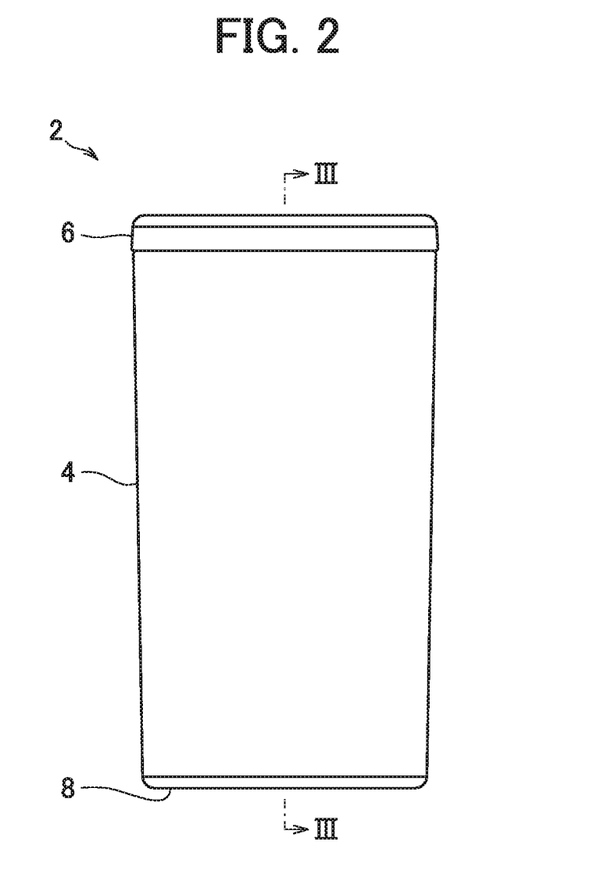
FIG. 2 is a front view of the battery spacer according to the embodiment of the present disclosure.

As shown in FIG. 2, the case body 4 has a cylindrical body provided with a bottom wall portion 8 at the other end, that is, a bottomed cylindrical shape.

Figure 3:
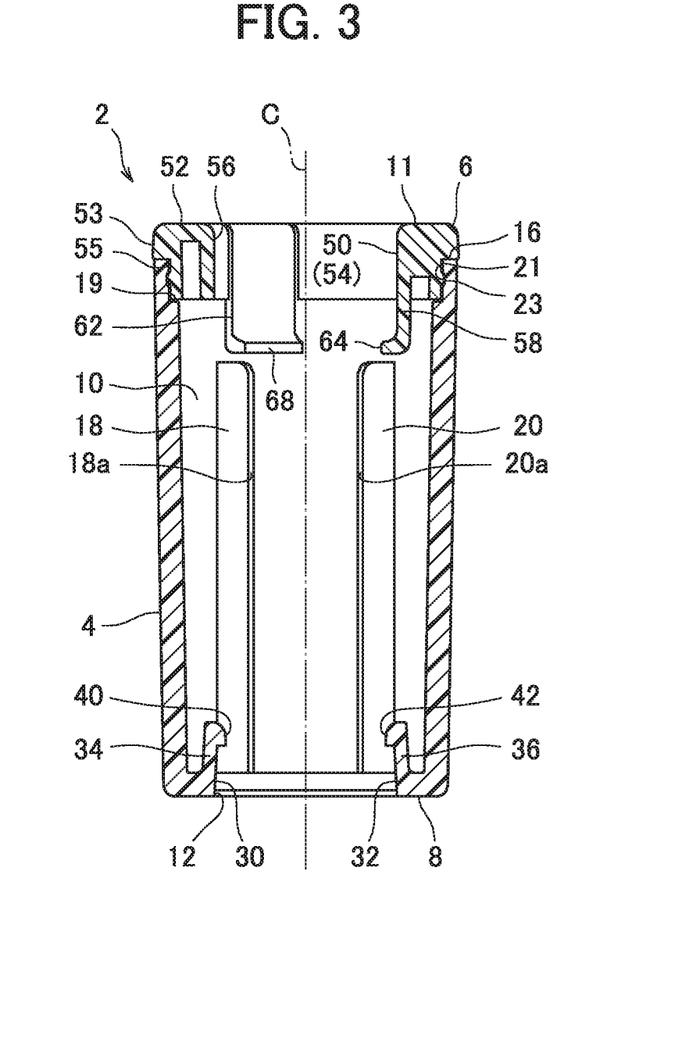
FIG. 3 is a cross-sectional view along line III-III in FIG. 2.

As shown in FIG. 3, the case body 4 has an upper-end opening 16 at one end. In a portion of the inner peripheral wall 10 of the case body 4 adjacent to the upper-end opening 16, a predetermined area extending in the direction from the upper-end opening 16 to the bottom wall portion 8 is thinned, thereby forming a step portion 19. An engagement recess 21 is provided in a predetermined position on the inner peripheral wall 10 in the thinned portion. The step portion 19 and the engagement recess 21 are used for engagement with the top wall member 6.

As shown in FIG. 3, a first guide plate 18, a second guide plate 20, a third guide plate 22, and a fourth guide plate 24, which are thin plates, are provided on the inner peripheral wall 10 of the case body 4. The first guide plate 18, the second guide plate 20, the third guide plate 22, and the fourth guide plate 24 are arranged at regular intervals along the circumferential direction of the case body 4, and the distal ends 18a, 20a, 22a, and 24a of the guide plates face the central axis C of the case body 4. Hence, the first guide plate 18 and the third guide plate 22 are opposed to each other, and the second guide plate 20 and the fourth guide plate 24 are opposed to each other. In this embodiment, a distance substantially equal to the diameter of a tan-3 cylindrical battery (hereinafter referred to as "battery 3") is provided between the distal end 18a of the first guide plate 18 and the distal end 22a of the third guide plate 22 which face each other, and between the distal end 20a of the second guide plate 20 and the distal end 24a of the fourth guide plate 24 which face each other.

These guide plates guide the battery 3 inserted into the case body 4.

An anode exposure hole 12 for exposing the negative terminal 13 of the battery 3 is provided at the center of the bottom wall portion 8 of the case body 4. As is clear from FIG. 4, when viewed from above, the anode exposure hole 12 includes a first straight portion 26 obtained by notching the left side of the circle, a second straight portion 28 obtained by notching the right side of the circle, and a first arcuate portion 30 and a second arcuate portion 32 which extend between the first straight portion 26 and the second straight portion 28 and face each other.

Figure 4:
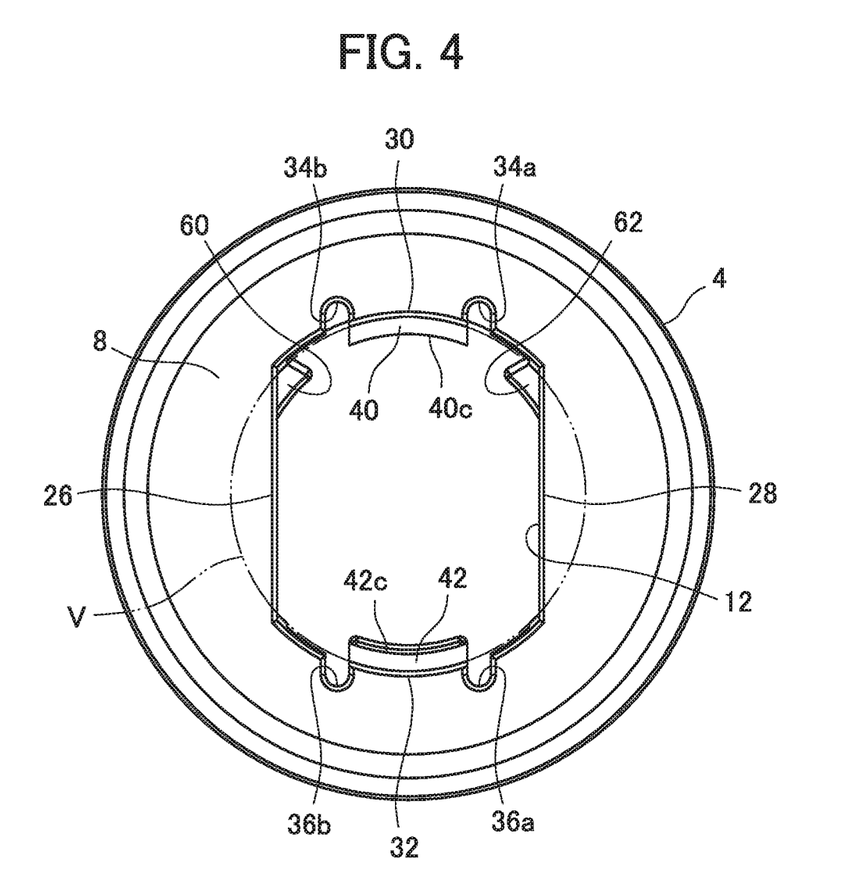
FIG. 4 is a plan view of the battery spacer according to the embodiment of the present disclosure viewed from the bottom wall portion side.

A first anode-side catching piece 34 and a second anode-side catching piece 36 are provided on the inner surface of the bottom wall portion 8 of the case body 4. To be specific, as shown in FIG. 3, the first anode-side catching piece 34 is provided so that it extends from the inner peripheral edge of the first arcuate portion 30 in the anode exposure hole 12 toward the interior of the case body 4, and the second anode-side catching piece 36 is provided so that it extends from the inner peripheral edge of the second arcuate portion 32 in the anode exposure hole 12 toward the interior of the case body 4. The first anode-side catching piece 34 and the second anode-side catching piece 36 have elasticity. As shown in FIG. 4, slits 34a and 34b are provided on both sides of the first anode-side catching piece 34, and slits 36a and 36b are provided on both sides of the second anode-side catching piece 36. These slits 34a, 34b, 36a, and 36b act to facilitate radial movement of the case body 4 at the first anode-side catching piece 34 and the second anode-side catching piece 36.

A first anode-side engagement hook 40 and a second anode-side engagement hook 42 projecting toward the central axis C of the case body 4 are provided at the tips of the first anode-side catching piece 34 and the second anode-side catching piece 36, respectively. As is clear from FIG. 4, the first anode-side engagement hook 40 and the second anode-side engagement hook 42 have such arc shapes that their shapes in the plan view contour the outer periphery of the battery 3.

Figure 5:
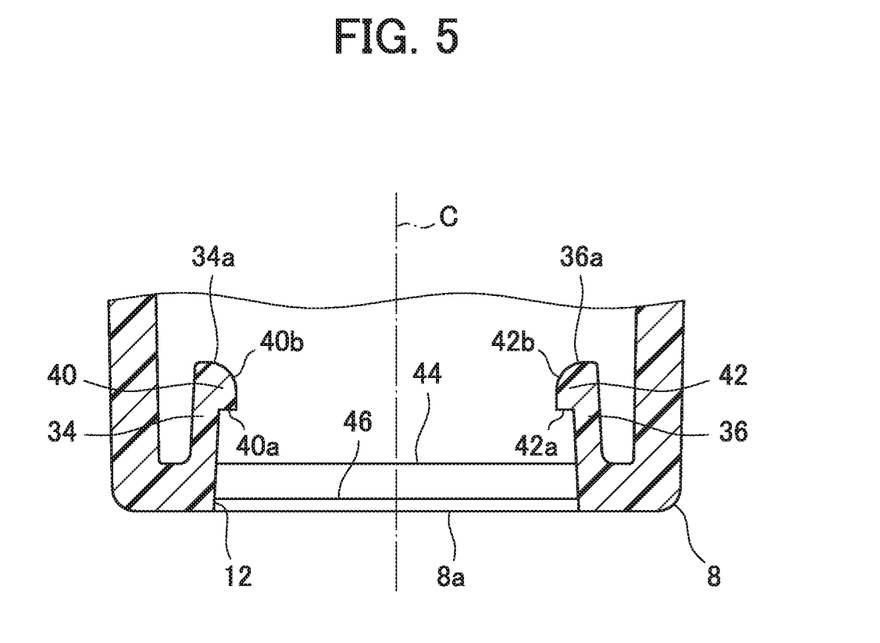
FIG. 5 is a cross-sectional enlarged view of the bottom wall portion of the battery spacer according to the embodiment of the present disclosure.

In addition, the first anode-side engagement hook 40 has a cross sectional shape shown in FIG. 5 and includes a straight portion 40a extending straight toward the central axis C of the case body 4, and an arcuate inclined portion 40b extending arcuately from the distal end 34a of the first anode-side catching piece 34 to the distal end of the straight portion 40a. On the other hand, as shown in FIG. 5, the second anode-side engagement hook 42 has a cross sectional shape symmetric to that of the first anode-side engagement hook 40 and includes a straight portion 42a extending straight toward the central axis C of the case body 4, and an arcuate inclined portion 42b extending arcuately from the distal end 36a of the second anode-side catching piece 36 to the distal end of the straight portion 42a.

As shown in FIG. 4, the distal end 40c of the first anode-side engagement hook 40 and the distal end 42c of the second anode-side engagement hook 42 are located radially inner than a virtual circle (hereinafter referred to as "battery virtual circle V") corresponding to the outer periphery of the battery 3 when the central axis C of the case body 4 and the central axis of the battery 3 are matched to each other. Here, it is preferable that the outside diameter of the battery virtual circle V be assumed to be the minimum outside diameter within the allowable range according to the specifications of the tan-3 battery 3.

As shown in FIG. 5, on an inner surface portion 44 of the bottom wall portion 8, an engagement recess 46 for receiving the negative terminal portion 7 of the battery 3 is provided in an area in contact with the negative terminal portion 7 of the contained battery 3. Here, when the battery 3 is contained in the case body 4, the negative terminal portion 7 of the battery 3 is partially engaged with the engagement recess 46 while its portion facing the anode exposure hole 12 is exposed. At this time, the negative terminal portion 7 of the battery 3 is located lower than the lowermost surface 8a of the bottom wall portion 8. This is therefore effective in preventing the negative terminal 13 of the battery 3 from erroneously coming into contact with the portion of the battery compartment other than the anode-side contact.

Subsequently, as shown in FIG. 3, the top wall member 6 is provided integrally with the upper-end opening 16 at one end of the case body 4, thereby providing an insertion port 50 for the battery 3.

The top wall member 6 includes an annular plate portion 52 having an annular shape, an outer peripheral wall 53 extending from the outer peripheral edge of the annular plate portion 52, and a central opening 54 provided at the center of the annular plate portion 52.

Here, the outer peripheral wall 53 is provided with a reduced-diameter portion 55 located opposite to the annular plate portion 52. An engagement projection 23 to engage with the engagement recess 21 is provided in a predetermined position on the outer peripheral surface of the reduced-diameter portion 55.

The central opening 54 of the top wall member 6 serves as the insertion port 50 for the battery 3.

A first cathode-side catching piece 58, a second cathode-side catching piece 60, and a third cathode-side catching piece 62 which extend toward the interior of the case body 4 are provided at the inner peripheral edge 56 of the central opening 54. The first cathode-side catching piece 58, the second cathode-side catching piece 60, and the third cathode-side catching piece 62 have elasticity. In addition, the first cathode-side catching piece 58, the second cathode-side catching piece 60, and the third cathode-side catching piece 62 are disposed at regular intervals along the circumferential direction.

A first cathode-side engagement hook 64, a second cathode-side engagement hook 66, and a third cathode-side engagement hook 68 extending toward the central axis C of the case body 4 are provided at the distal ends of the first cathode-side catching piece 58, the second cathode-side catching piece 60, and the third cathode-side catching piece 62, respectively. As is clear from FIG. 6, the first cathode-side engagement hook 64, the second cathode-side engagement hook 66, and the third cathode-side engagement hook 68 have such arc shapes that their shapes in the plan view contour the outer periphery of the battery 3. Further, as is clear from FIG. 3, the first cathode-side engagement hook 64, the second cathode-side engagement hook 66, and the third cathode-side engagement hook 68 have a generally L-shaped cross section. Furthermore, as is clear from FIG. 6, the distal end 64a of the first cathode-side engagement hook 64, the distal end 66a of the second cathode-side engagement hook 66, and the distal end 68a of the third cathode-side engagement hook 68 are located radially inner than the battery virtual circle V.

Figure 6:
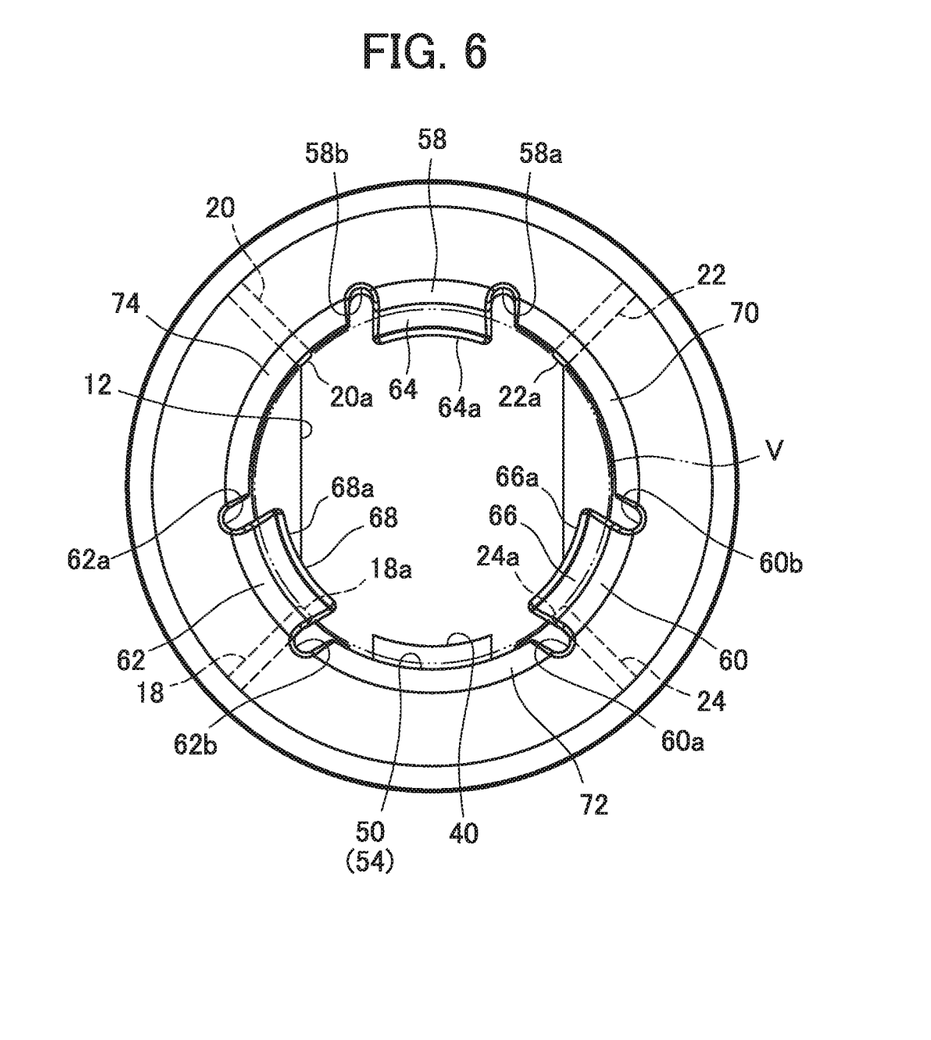
FIG. 6 is a plan view of the battery spacer according to the embodiment of the present disclosure viewed from the top wall member side.

Further, in the central opening 54, a first suspended wall 70, a second suspended wall 72, and a third suspended wall 74 are provided between the first cathode-side catching piece 58 and the second cathode-side catching piece 60, between the second cathode-side catching piece 60 and the third cathode-side catching piece 62, and between the third cathode-side catching piece 62 and the first cathode-side catching piece 58, respectively. The first suspended wall 70, the second suspended wall 72, and the third suspended wall 74 have arc shapes that contour the inner periphery of the central opening 54, and slits 58a, 58b, 60a, 60b, 62a, and 62b are provided between the adjacent cathode-side catching pieces. These slits 58a, 58b, 60a, 60b, 62a, and 62b act to facilitate radial movement of the case body 4 at the first cathode-side catching piece 58, the second cathode-side catching piece 60, and the third cathode-side catching piece 62. In addition, the first suspended wall 70, the second suspended wall 72, and the third suspended wall 74 are located substantially at the same position as the battery virtual circle V or slightly radially outer than the battery virtual circle V, and guide the battery 3 inserted into the case body 4 like the first guide plate 18, the second guide plate 20, the third guide plate 22, and the fourth guide plate 24.

A procedure for manufacturing the battery spacer 2 according to this embodiment involves first injection-molding a resin material to manufacture the case body 4 and the top wall member 6 having the above-described structures. The obtained top wall member 6 is fixed to the upper-end opening 16 at one end of the case body 4. To be specific, the reduced-diameter portion 55 of the outer peripheral wall 53 of the top wall member 6 is fitted into the step portion 19 of the case body 4. At this time, the engagement recess 21 of the case body 4 and the engagement projection 23 of the top wall member 6 are engaged with each other, and the top wall member 6 is fixed to the case body 4. Thus, the battery spacer 2 according to this embodiment shown in FIG. 1 is obtained.

The method of fixing the top wall member 6 and the case body 4 together is not limited to the above-described mode: for example, a welding method using ultrasonic welding or a bonding method using an adhesive may be employed.

Figure 7:
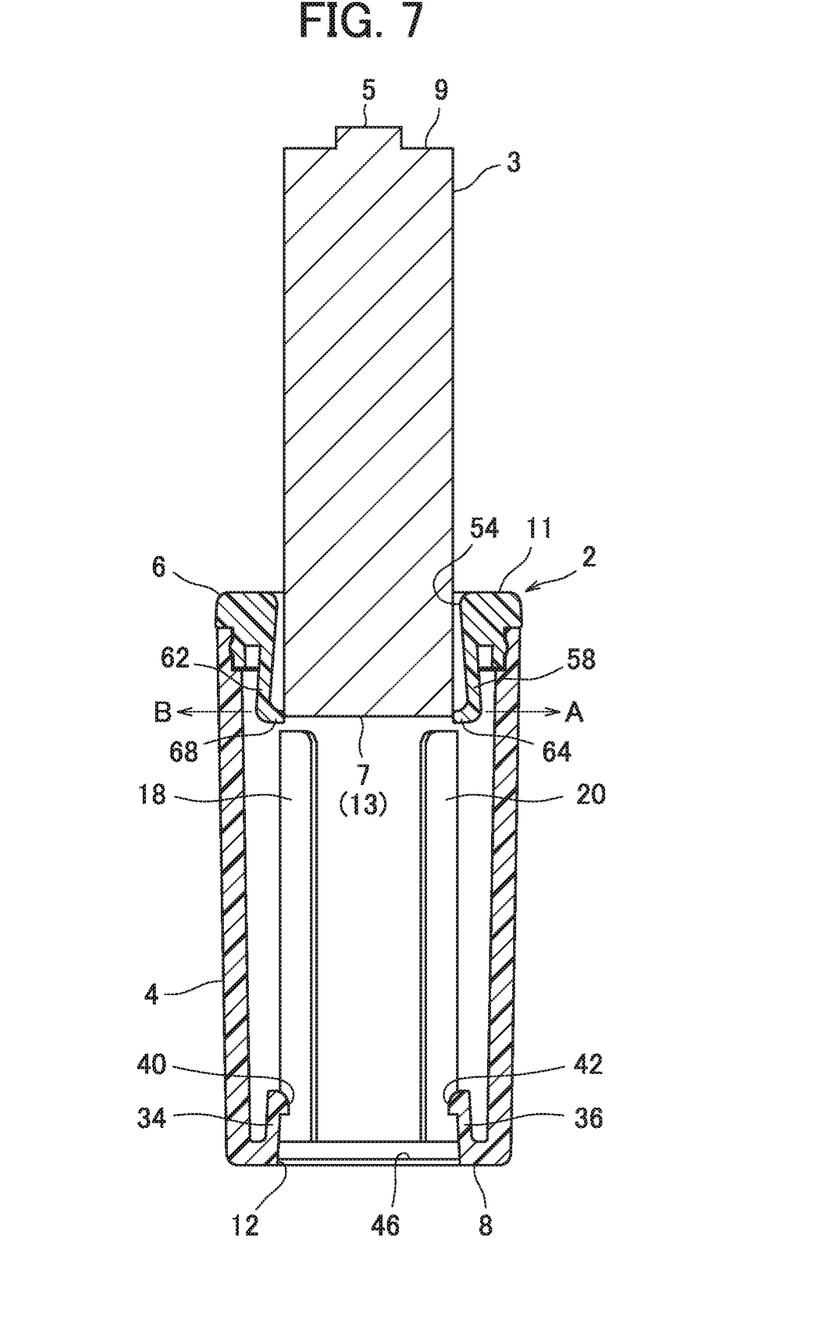
FIG. 7 is a cross-sectional view showing the state where a battery is being inserted into the battery spacer according to the embodiment of the present disclosure.
Figure 8:
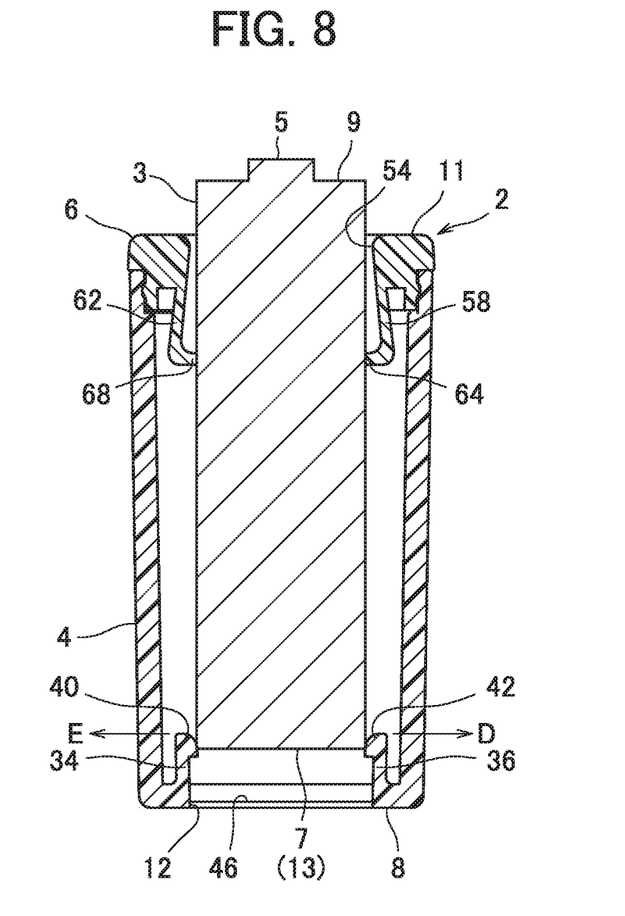
FIG. 8 is a cross-sectional view showing the state where the inserted battery is behind its previous position shown in FIG. 7.
Figure 9:
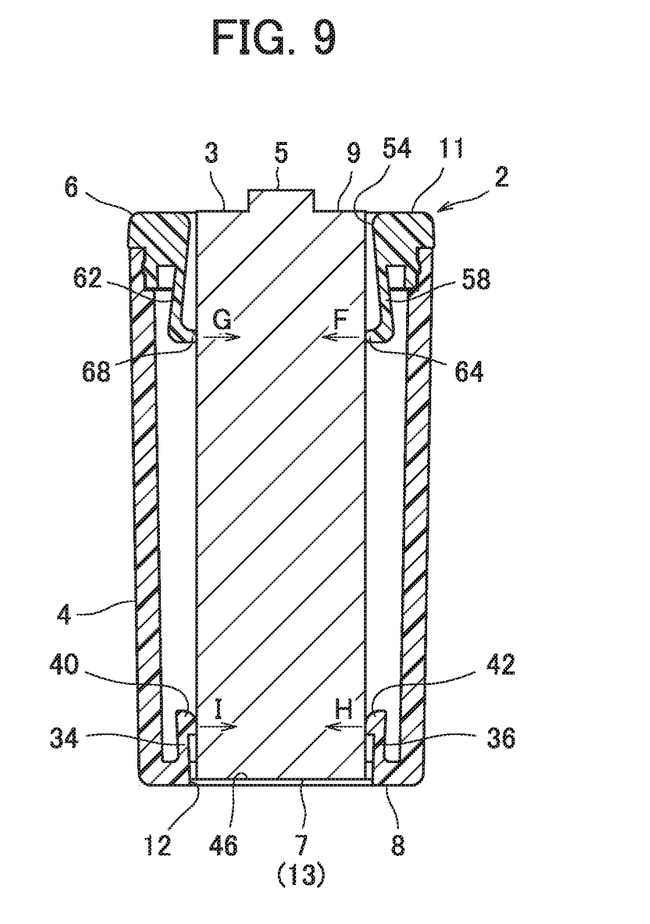
FIG. 9 is a cross-sectional view showing the state where the battery is completely contained the battery spacer according to the embodiment of the present disclosure.

A method of using the battery spacer 2 will now be described below. In FIGS. 7 to 9, in order to clarify the relationship between the cathode-side catching piece and the battery 3, the third cathode-side catching piece 62 is drawn in a position shifted from the actual position along the circumferential direction.

First, as shown in FIG. 7, the user inserts the tan-3 battery 3 into the obtained battery spacer 2 through the central opening 54 (the insertion port 50 for the battery 3) in the top wall member 6. At this time, the battery 3 is inserted into the battery spacer 2 with the negative terminal portion 7 first. The user pushes the battery 3 with his/her finger to advance the battery 3 into the battery spacer 2. Consequently, in this process, the outer peripheral edge of the negative terminal portion 7 comes into contact with the first cathode-side engagement hook 64, the second cathode-side engagement hook 66, and the third cathode-side engagement hook 68. Further pushing the battery 3 into the battery spacer 2 in this state pushes the first cathode-side catching piece 58, the second cathode-side catching piece 60, and the third cathode-side catching piece 62 radially outward of the battery spacer 2 (in the direction indicated by the arrows A and B in FIG. 7), so that the battery 3 is received. The battery 3 then further proceeds toward the bottom wall portion 8 within the battery spacer 2. At this time, the battery 3 proceeds within the battery spacer 2 while being guided by the first suspended wall 70, the second suspended wall 72, and the third suspended wall 74, and the first guide plate 18, the second guide plate 20, the third guide plate 22, and the fourth guide plate 24.

Afterwards, as shown in FIG. 8, the negative terminal portion 7 of the battery 3 comes into contact with the arcuate inclined portions 40b and 42b of the first anode-side engagement hook 40 and the second anode-side engagement hook 42. Further pushing the battery 3 into the battery spacer 2 in this state gradually pushes the first anode-side catching piece 34 and the second anode-side catching piece 36 radially outward of the battery spacer 2 (in the direction indicated by the arrows D and E in FIG. 8). When the negative terminal portion 7 of the battery 3 crosses the straight portions 40a and 42a of the first anode-side engagement hook 40 and the second anode-side engagement hook 42, the battery 3 advances all at once and the negative terminal portion 7 of the battery 3 swiftly comes into contact with the engagement recess 46. At this time, the user can obtain a click feeling and recognize that the battery 3 has reached the engagement recess 46 of the bottom wall portion 8.

In this manner, the tan-3 battery 3 is contained in the battery spacer 2 as shown in FIG. 9. Here, as is clear from FIG. 9, in the battery spacer 2, the distance from the engagement recess 46 to the top surface 11 is set substantially equal to the distance from the bottom surface of the negative terminal portion 7 of the battery 3 to the shoulder portion 9 of the battery 3. Accordingly, the shoulder portion 9 of the contained battery 3 is flush with the top surface 11 of the battery spacer 2 (top wall member 6). Regarding the battery spacer 2, it is preferable to determine the dimensions of each part of the battery spacer 2 in such a manner that the top surface 11 is located in a position closer to the bottom wall portion 8 than one end face (the end face of the shoulder portion 9) located around the positive terminal 5 of the contained battery 3. Hence, the positive terminal 5 of the battery 3 can be above the top surface 11 of the battery spacer 2.

The battery spacer 2 containing the tan-3 battery 3 as described above is installed in the battery compartment of the electric device, the negative terminal portion 7 comes into contact with the anode-side contact in the battery compartment, and the positive terminal 5 comes into contact with the cathode-side contact in the battery compartment; thus, the electrical device is driven. In other words, an electric device configured to run on a tan-2 battery can run normally on a tan-3 battery 3 which is obtained by changing the size of a tan-2 battery.

Here, the battery spacer 2 according to the present disclosure holds the outer peripheral surface of the battery 3 adjacent to the positive terminal 5 through the first cathode-side catching piece 58 having the first cathode-side engagement hook 64, the second cathode-side catching piece 60 having the second cathode-side engagement hook 66, and the third cathode-side catching piece 62 having the third cathode-side engagement hook 68, and holds the outer peripheral surface of the battery 3 adjacent to the negative terminal portion 7 through the first anode-side catching piece 34 having the first anode-side engagement hook 40 and the second anode-side catching piece 36 having the second anode-side engagement hook 42.

The first cathode-side catching piece 58, the second cathode-side catching piece 60, the third cathode-side catching piece 62, the first anode-side catching piece 34, and the second anode-side catching piece 36 have elasticity, and exerts resilience radially inward of the battery spacer 2 (in the directions of the arrows F, G, H, and I in FIG. 9). In other words, the cathode-side catching piece and the anode-side catching piece are urged toward the central axis C of the case body 4. Thus, the battery 3 is subjected to an urging force given by the cathode-side catching piece and the anode-side catching piece, and the battery 3 is held with this urging force.

Since the battery spacer 2 according to this embodiment retains the battery 3 by holding the outer peripheral surface of the battery 3 as described above, the battery can be retained regardless of the outer diameter of the battery 3, leading to excellent versatility. To be specific, since the cathode-side catching piece and the anode-side catching piece are urged toward the central axis C of the case body 4, the cathode-side engagement hook and the anode-side engagement hook can be brought into good contact with the outer peripheral surface of the battery 3 regardless of the outside diameter of the battery 3. For this reason, the battery spacer 2 according to this embodiment can hold batteries from different manufacturers and or of different types and thus can hold batteries having different outside diameters, thereby leading to excellent versatility.

In the battery spacer 2 according to this embodiment, the distal ends of the first cathode-side engagement hook 64, the second cathode-side engagement hook 66, the third cathode-side engagement hook 68, the first anode-side engagement hook 40, and the second anode-side engagement hook 42 come into contact with the outer peripheral surface of the battery 3. In each of these engagement hooks, the contact area with the outer peripheral surface of the battery 3 is comparatively small, so that the stress can be concentrated on the distal end of the engagement hook, which contributes to an improvement in the ability to retain the battery.

Here, in the battery spacer 2 according to this embodiment, the distal ends of the first cathode-side engagement hook 64, the second cathode-side engagement hook 66, the third cathode-side engagement hook 68, the first anode-side engagement hook 40, and the second anode-side engagement hook 42 are located radially inner than the battery virtual circle V. Hence, the first cathode-side catching piece 58, the second cathode-side catching piece 60, the third cathode-side catching piece 62, the first anode-side catching piece 34, and the second anode-side catching piece 36 provide higher urging forces.

Further, in the case where the outside diameter of the battery virtual circle V is set to the minimum outside diameter within the allowable range according to predetermined specifications, for example, the specifications of the tan-3 battery, flexibility to some variations in the outside diameter of the contained battery within the specifications can be achieved, the battery can be contained with its outer peripheral surface pushed in a favorable manner, and the versatility of the battery spacer 2 can be enhanced.

As described above, the battery spacer 2 according to this embodiment, which retains both ends of the battery 3 such as the positive terminal end and the negative terminal end of the battery 3, retains the battery 3 at a larger number of points with a better balance between positions where it is retained than a conventional battery spacer which retains the outer peripheral surface of the battery 3 only at the positive terminal end, thereby exhibiting high ability to retain the battery 3. Accordingly, the battery spacer 2 according to the present disclosure can suppress the occurrence of the trouble that the battery 3 jumps out due to shaking by the user.

Further, in the battery spacer 2 according to this embodiment, the shoulder portion 9 of the contained battery 3 is flush with the top surface 11 of the battery spacer 2 (top wall member 6). Hence, the positive terminal 5 of the battery 3 protruding from the shoulder portion 9 is above the top surface 11 of the battery spacer 2. In other words, in the battery spacer 2 according to the present disclosure, no portion of the top surface 11 is above the positive terminal 5 of the contained battery 3, preventing the problem that the positive terminal 5 of the battery 3 fails to come into contact with the cathode-side contact of the battery compartment.

The present disclosure is not limited to the above embodiment and various modifications can be made. Although three cathode-side catching pieces each having a cathode-side engagement hook, and two anode-side catching pieces each having an anode-side engagement hook are formed in the embodiment described above, the numbers should not be limited to these: more than three cathode-side catching pieces each having a cathode-side engagement hook, and more than two anode-side catching pieces each having an anode-side engagement hook may be formed. An increase in the number of cathode-side engagement hooks and anode-side engagement hooks is preferable because it enhances the ability to retain the battery.

Although the battery spacer 2 is manufactured by combining the separately manufactured case body 4 and top wall member 6 in the embodiment described above, this is not necessarily the case: the battery spacer 2 may be manufactured by integrally molding a portion corresponding to the case body 4 and a portion corresponding to the top wall member 6.

Although the size of the battery spacer 2 is the same size as that of a tan-2 battery and the contained battery is the tan-3 battery 3 in the above embodiment, the combination of the sizes of the battery spacer 2 and the contained battery 3 is not limited to this and any other appropriate combination may be adopted.

Aspects of the Disclosure

A first aspect of the present disclosure is a battery spacer comprising: a cylindrical body into which a cylindrical battery is inserted; a bottom wall portion with which an anode-side end of the cylindrical battery is to come into contact, the bottom wall portion having an anode exposure hole from which a negative terminal of the cylindrical battery is partially exposed; a first holder that holds an outer peripheral surface of the cylindrical battery; and a second holder that holds the outer peripheral surface of the cylindrical battery in a position separated from the first holder along the direction of the axis of the cylindrical battery.

In a second aspect of the present disclosure according to the first aspect of the present disclosure, the first holder is urged toward the central axis of the body, and has a plurality of anode-side catching pieces for holding an anode side of the cylindrical battery, and the second holder is urged toward the central axis of the body, and has a plurality of cathode-side catching pieces for holding a cathode-side of the cylindrical battery.

In a third aspect of the present disclosure according to the second aspect of the present disclosure, the plurality of anode-side catching pieces each has an anode-side engagement hook at the distal end, the anode-side engagement hook being configured to engage with an outer peripheral surface of the cylindrical battery, and the plurality of cathode-side catching pieces each has a cathode-side engagement hook at the distal end, the cathode-side engagement hook being configured to engage with an outer peripheral surface of the cylindrical battery.

In a fourth aspect of the present disclosure according to the third aspect of the present disclosure, the anode-side engagement hooks and the cathode-side engagement hooks protrude toward the central axis of the body, and the distal ends of the anode-side engagement hooks and the distal ends of the cathode-side engagement hooks are located radially inner than a battery virtual circle that is virtualized when the central axis of the body and the central axis of the cylindrical battery are matched to each other and corresponds to the outer periphery of the cylindrical battery.

In a fifth aspect of the present disclosure according to the fourth aspect of the present disclosure, the outside diameter of the battery virtual circle is set to an allowable minimum outside diameter according to predetermined specifications of the battery.

In a sixth aspect of the present disclosure according to any one of the second to fifth aspects of the present disclosure, an annular top wall that is located opposite to the bottom wall portion and has a central opening into which the cylindrical battery is inserted is further included, the plurality of anode-side catching pieces extend from the inner peripheral edge of the anode exposure hole toward the interior of the body, and the plurality of cathode catching pieces extend from the inner peripheral edge of the central opening toward the interior of the body.

In a seventh aspect of the present disclosure according to the sixth aspect of the present disclosure, when the cylindrical battery is contained in the body, a top surface of the top wall is located in a position flush with one end face around a positive terminal of the cylindrical battery or in a position closer to the bottom wall portion than the one end face.

EXPLANATION OF REFERENCE SIGNS

2 Battery spacer
3 Battery
4 Case body
5 Positive terminal
6 Top wall member
7 Negative terminal portion
8 Bottom wall portion
9 Shoulder portion
11 Top surface
12 Anode exposure hole
34 First anode-side catching piece
36 Second anode-side catching piece
40 First anode-side engagement hook
42 Second anode-side engagement hook
58 First cathode-side catching piece
60 Second cathode-side catching piece
62 Third cathode-side catching piece
64 First cathode-side engagement hook
66 Second cathode-side engagement hook
68 Third cathode-side engagement hook
C Central axis
V Battery virtual circle

The invention claimed is:
1. A battery spacer comprising:
a cylindrical body into which a cylindrical battery is inserted;
a bottom wall portion with which an anode-side end of the cylindrical battery is configured to come into contact, the bottom wall portion having an anode exposure hole from which a negative terminal of the cylindrical battery is partially exposed;

a first holder that holds an outer peripheral surface of the cylindrical battery in a first end region adjacent to the bottom wall portion; and a second holder that holds the outer peripheral surface of the cylindrical battery in a second end region separated from the first end region along a direction of a central axis of the cylindrical battery;

wherein the outer peripheral surface of the cylindrical battery is held by the first holder and the second holder in only the first end region and the second end region, respectively;

wherein the first holder is resiliently urged radially inward toward a central axis of the cylindrical body, and has a plurality of anode-side catching pieces for holding an anode side of the cylindrical battery, each of the plurality of anode-side catching pieces having an anode-side engagement hook at a distal end thereof that is configured to engage with the outer peripheral surface of the cylindrical battery, and the anode-side engagement hook has a cross-sectional shape that includes a straight portion extending perpendicular to the outer peripheral surface of the cylindrical battery and an arcuate inclined portion extending arcuately from the distal end of a respective first anode-side catching piece of the plurality of anode-side catching pieces to a distal end of the straight portion, the arcuate inclined portion being configured to engage with and guide the cylindrical battery during insertion into the cylindrical body; and wherein the second holder is resiliently urged radially inward toward the central axis of the cylindrical body, and has a plurality of cathode-side catching pieces for holding a cathode-side of the cylindrical battery, each of the plurality of cathode-side catching pieces having a cathode-side engagement hook at a distal end thereof that is configured to engage with the outer peripheral surface of the cylindrical battery, and the cathode-side engagement hook has an L-shaped cross-section, with a distal end of the L-shaped cross-section of the cathode-side engagement hook being configured to engage with the outer peripheral surface of the cylindrical battery.

2. The battery spacer according to claim 1, wherein the plurality of anode-side catching pieces consists of two anode-side catching pieces, and the plurality of cathode-side catching pieces consists of three cathode-side catching pieces.

3. The battery spacer according to claim 1, wherein:
the anode-side engagement hooks and the cathode-side engagement hooks protrude toward the central axis of the cylindrical body, and the distal ends of the anode-side engagement hooks and the distal ends of the cathode-side engagement hooks are resiliently urged toward positions that are located radially inner from a cylindrical space that corresponds to the outer periphery of the cylindrical battery when the central axis of the cylindrical body and the central axis of the cylindrical battery are matched to each other.

4. The battery spacer according to claim 3, wherein an outside diameter of the cylindrical space is set to an allowable minimum outside diameter according to a predetermined size specification of the cylindrical battery.

5. The battery spacer according to claim 1, further comprising an annular top wall that is located opposite to the bottom wall portion, and the annular top wall has a central opening into which the cylindrical battery is inserted, wherein:
the plurality of anode-side catching pieces extend from an inner peripheral edge of the anode exposure hole toward an interior of the cylindrical body, and
the plurality of cathode catching pieces extend from an inner peripheral edge of the central opening toward the interior of the cylindrical body.

6. The battery spacer according to claim 5, wherein when the cylindrical battery is contained in the cylindrical body, a top surface of the annular top wall is located in a position flush with one end face around a positive terminal of the cylindrical battery or in a position closer to the bottom wall portion than the one end face.

\* \* \* \* \*

UNITED STATES PATENT AND TRADEMARK OFFICE
CERTIFICATE OF CORRECTION

| | | |
|---|---|---|
| PATENT NO. | : 11,258,130 B2 | |
| APPLICATION NO. | : 16/327601 | |
| DATED | : February 22, 2022 | |
| INVENTOR(S) | : Mika Takayanagi | |

It is certified that error appears in the above-identified patent and that said Letters Patent is hereby corrected as shown below:

On the Title Page

Item (22) PCT Filed:
Delete "June 18, 2017"
Insert -- July 18, 2017 --

Signed and Sealed this
Twenty-sixth Day of April, 2022

Katherine Kelly Vidal
*Director of the United States Patent and Trademark Office*